United States Patent [19]
Yang

[11] Patent Number: 6,081,101
[45] Date of Patent: Jun. 27, 2000

[54] TEMPERATURE SWITCH CONTROLLED CHARGING CIRCUIT

[76] Inventor: Tai-Her Yang, 6F-5 No. 250, Sec. 4, Chung Hsiao E. Rd., Taipei, Taiwan

[21] Appl. No.: 09/148,118

[22] Filed: Sep. 4, 1998

[51] Int. Cl.⁷ ................................................ H01M 10/46
[52] U.S. Cl. ................................................................ 320/154
[58] Field of Search ................................ 320/154, 150, 320/158, 166, 167

[56] References Cited

U.S. PATENT DOCUMENTS

| | | | |
|---|---|---|---|
| 4,609,861 | 9/1986 | Inaniwa et al. | 320/152 |
| 5,319,298 | 6/1994 | Wanzong et al. | 320/158 |

*Primary Examiner*—Edward H. Tso
*Attorney, Agent, or Firm*—Bacon & Thomas, PLLC

[57] ABSTRACT

A battery charging circuit includes a temperature switch actuated when the temperature of a battery reaches a preset value as a result of the battery being charged to saturation. The temperature control switch causes the circuit to switch to a small current, which maintains the charge status of the battery within a predetermined power source voltage variation range until the battery is removed or the power source cut off. A power source is included for supplying the charging current to the battery and also for driving a load. The charging circuit includes a return current diode for providing an automatic emergency power supply from the battery to the load when the power source is cut-off.

8 Claims, 2 Drawing Sheets

TEMPERATURE SWITCH CONTROLLED CHARGING CIRCUIT

BACKGROUND AND SUMMARY

Like the circuit of the invention, the conventional automatic shut-off and transient holding type charging circuit uses a voltage or current detector device constituted by electronic components to charge a chargeable battery. The circuit includes a temperature switch which senses the temperature of the chargeable battery so that when the battery is saturated and the temperature is raised, the charger is switched to provide a smaller current input to the battery.

However, the conventional automatic shut-off and transient state holding type charge circuit is comprised of numerous components, and has a complicated structure with high cost and low reliability.

The circuit of the invention uses a temperature switch to control automatic shut-off, but with a less complicated and lower cost structure for applications involving a wider voltage range than the conventional circuit.

According to the invention, when the battery is charge to saturation, and when the battery temperature is raged to a preset value, the temperature control switch is actuated, which causes the circuit to automatically switch to a small current. The small current maintains the charging status before the temperature switch is automatically reset, so that it is within the predetermined power source voltage variation range. Reset occurs when the battery is removed or the power source is cut off, and to include return current diode for providing an automatic emergency power supply function.

DETAILED DESCRIPTION OF THE PREFERRED EMBODIMENTS

The temperature switch controlled automatic shut-off and transient state holding type charging circuit of the invention includes the following elements:

● A charging power source, which may be a pure DC, semi-wave DC, full wave DC, sporadic pulsing DC, or rippled wave DC power source, and which can be a voltage stabilized power source or a power source variable within a predetermined voltage range;

● A chargeable/dis-chargeable secondary battery for matching with a temperature control switch; and ● A transient state holding circuit for applications in a wide range of voltages, including solid statement or electromechanical circuit components controlled by a temperature switch attached to the battery. When the chargeable battery is charged to near saturation and the temperature is raised, through the control of the temperature switching device, a thyristor SCR101 is tripped and a bypass current-limiting circuit supplies a smaller topping charge current input to the chargeable battery to provide a charge holding function, the charge holding function of the transient state holding circuit being maintained within the wide voltage variation range for matching with the wide voltage range variations without interference until the power source is closed or the chargeable battery is removed, thereby resetting the transient state holding circuit.

Figure 1:
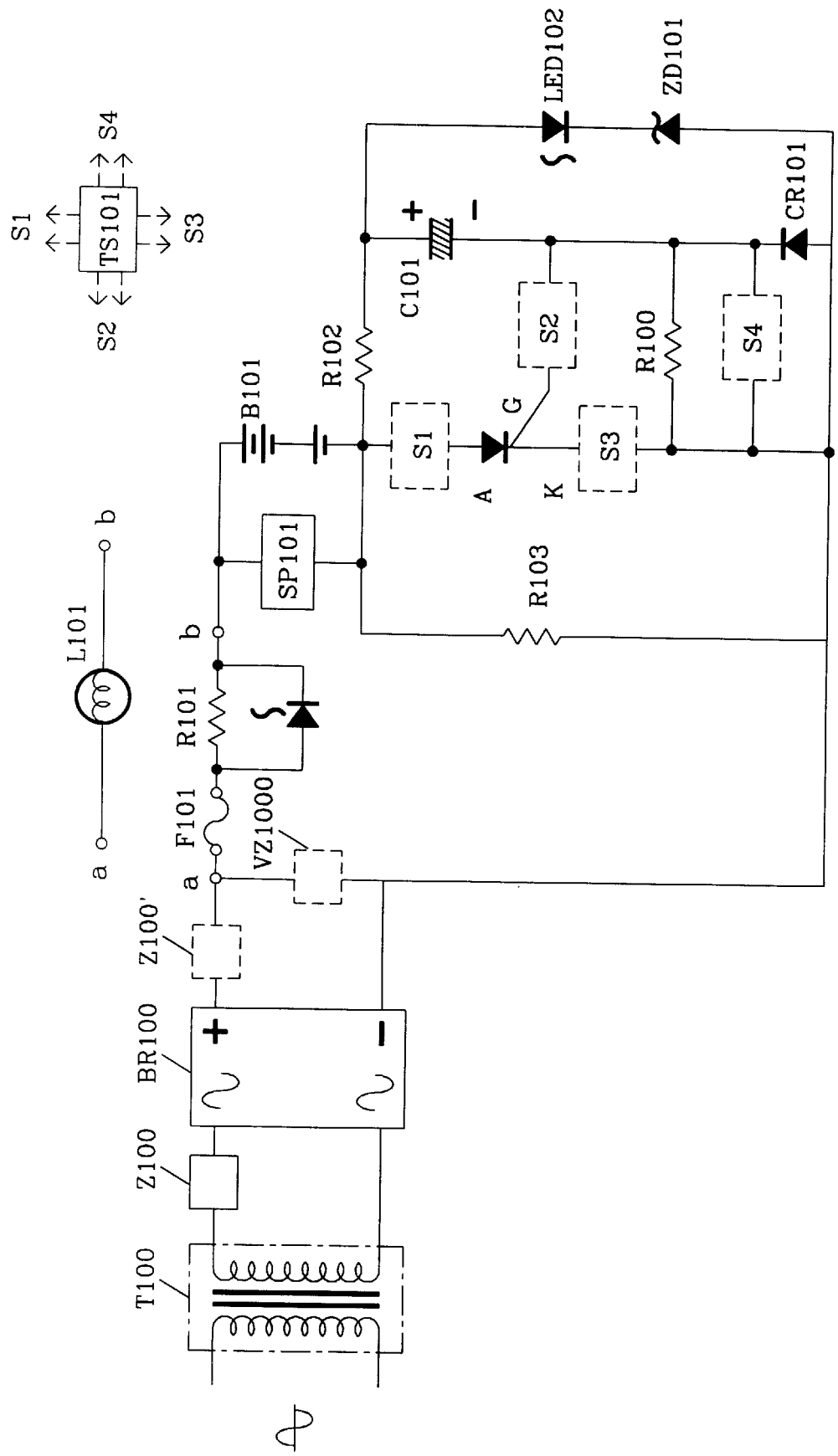
FIG. 1 is a schematic circuit diagram of the invention, illustrating an automatic shut-off charging circuit for a chargeable battery and equipped with a temperature control switch.

Referring to FIG. 1, the charging circuit of a first preferred embodiment of the invention includes, in addition to the above-described power source, the following elements:

● An AC transformer T100, including primary and secondary terminals for receiving an AC power input and secondary terminals for providing an AC power output, and which can be optionally installed or omitted for direct AC input according to circuit requirements;

● An AC current-limiting impedance Z100 in the form of a capacitive, inductive, or resistive impedance component, or a mixed type AC current-limiting impedance device constituted by two or more than two of such impedance components for preventing short-circuits at the load side and which are series combined between the AC power source and the rectifier device BR100;

● An optional DC current-limiting impedance device Z100' for a DC power source or rectified AC-to-DC power source, in case the AC current-limiting impedance Z100 is not series combined at the AC side, in which the DC current-limiting impedance device (which may be constituted by a resistance, or active transistors and a driving circuit) is series combined between the DC power source and the load;

● An optional zener effect component VZ1000 selected according to requirements, which is constituted by a zener diode or group of bias diodes having an appropriate current direction to provide voltage stabilizing functions;

● A chargeable battery B101 series combined with its matched temperature switch device TS101 and then series combined with the thyristor SCR101 in the current direction;

● A chargeable battery B101 series combined with its matched temperature switch device TS101 and then series combined with the thyristor SCR101 in the current direction;

● A display and protector circuit optionally including a current-limiting resistor R101 installed between the battery B101 and the charging power source and connected in parallel with a light-emitting diode LED 101 to provide a display function, the resistor R101 being further series combined with an overload protector component F101, as well as with the chargeable battery B101, and an anode A and cathode K of the thyristor SCR101 in the current direction leading to the charging power; the aforesaid current-limiting resistor R101, the light-emitting diode LED 101, and overload protector component F101 alternatively being replaceable by a fuse type light bulb L101;

● An auxiliary or surplus voltage and surge voltage protector component SP101 optionally installed according to requirements and constituted by a solid state auxiliary voltage or surge voltage protector component connected in parallel between the power source terminals, or in series combined between the output side of the circuit protector component and another pole of the power source according to the requirements, or connected in parallel between the two ends of the chargeable battery;

● A distributed voltage resistor R102 series combined with the trigger capacitor C101, one terminal of the distributed voltage resistor R102 being combined with the negative pole of the chargeable battery B101, and another end of the capacitor C101 being connected to the trigger gate G of the thyristor SCR101, the anode of the thyristor SCR101 being connected to the negative pole of the battery, and a parallel combined distributed current resistor R100 being optionally installed between the gate G and cathode K of the thyristor as required to adjust the stability of the gate current and the trigger sensibility;

● A temperature switching device TS101 constituted by an electromechanical type thermostatic switch or solid state temperature detector component and its matching switching circuit, including positive temperature coefficient (PTC) or negative temperature coefficient components or thermocouples, and the aforesaid electromechanical type thermostatic switching components or switch circuit controlled by a solid state temperature detector component include:

1) a switch connected between anode A of SCR101 and the negative terminal of the chargeable battery B101;

2) a switch connected between the gate G of SCR101 and the trigger power source;

3) a switch connected to the cathode K of SCR101; and 4) a switch connected between the gate G and cathode K of SCR101, whereby when the chargeable battery reaches a preset temperature, the operation is shut off, and wherein switches S1, S2 and S3 provide an overheat cut-off switching function, and switch S4 provides an overheat closing switching function;

● A display light-emitting diode LED102 and zener diode ZD101 series combined with LED102 to provide a voltage-limiting and distributed current function, and parallel combined with the junction point between the distributed voltage resistor R102 and capacitor C101 as well as the negative terminal of the charging power source to produce a voltage-limiting and bypass distributed current function, the voltage-limiting function being employed to suppress interference with the capacitor end voltage due to power source voltage variations, while the current passing through ZD101 (or the light-emitting diode LED102 which is further optionally installed in series with ZD101) is also used to provide a topping charge to the battery B101 after the thyristor SCR101 is shut off;

● A bypass distributed current resistor R102 which serves as the discharge resistor for capacitor C101 when the power is switched off or when the chargeable battery is removed, such that if the required topping charge current is larger, a parallel combined distributed current resistor between the "X" point and the negative terminal of the power source can be further optionally installed to relatively increase the holding charging current value; and ● A discharge diode CR101 parallel combined between the cathode K and gate G of the thyristor SCR101, the polarity of the diode CR101 being such that the capacitor C101 discharges through the bypass distributed current resistor R103 and aforesaid diode CR101 to provide a discharge circuit when the battery B101 is removed.

The circuit of FIG. 1 operates as follows:

● When the battery is charged at the beginning, the gate G of the thyristor SCR101 is triggered by the instant charging current through R102 to the capacitor C101 to trigger thyristor SCR101 and allow the circuit to charge the battery B101 at a normal charging current value. When the battery B101 reaches near saturation, the temperature increase causes the matched temperature switching device TS101 to cut off the current to the thyristor SCR101. As a result, the combined end voltage between the charging current passing through the bypass distributed current resistor R103, and the charging current passing through the distributed voltage resistor R102 and zener diode ZD101 (and the optionally series combined light-emitting diode LED102) are the same and are not affected by power source voltage variations.

● When the temperature switch TS101 is reset, if the power source voltage is varied within the predetermined range either with respect to the topping charge period or the reset period, the voltage level of the capacitor C101 remain unchanged, and no current flows through the thyristor SCR101 to trigger the gate G. The thyristor SCR101 thus remains in an open-circuit state. When the charging is completed and the battery B101 is removed, the accumulated power at capacitor C101 is then discharged through the distributed current resistor R103 and discharge diode CR101, thereby resetting the circuit back to the trigger prepared status.

Figure 2:
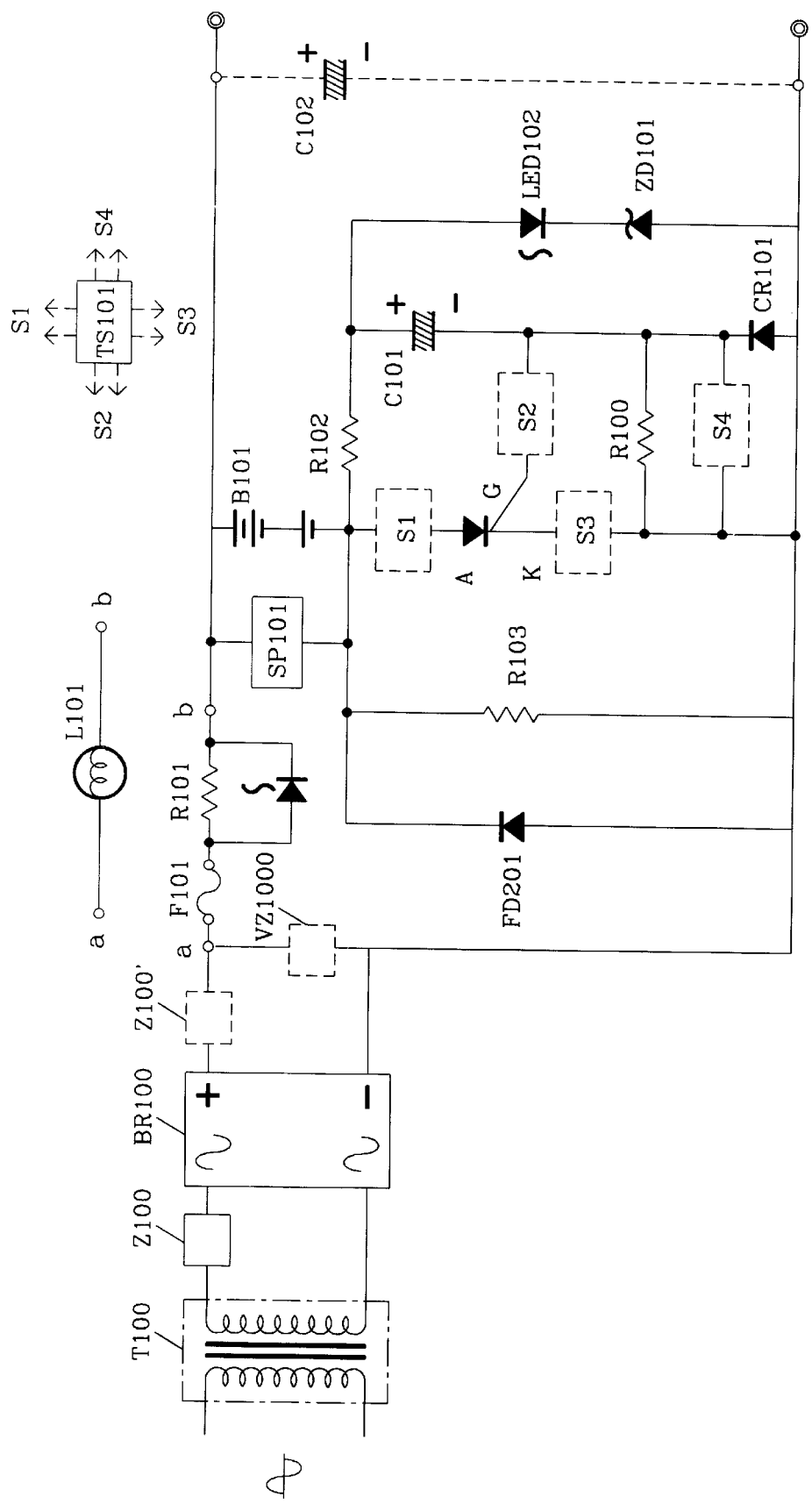
FIG. 2 is a schematic circuit diagram illustrating the circuit of FIG. 1, further installed with a return current diode to provide an automatic emergency power supply function.

The aforesaid embodying example can be further installed with a return current diode FD201, as illustrated in FIG. 2, so that the chargeable battery can provide power through the return current diode to the load originally driven by the positive and negative terminal of the DC power source when the power source is cut off. In addition to the circuit elements shown in FIG. 1, the circuit of this embodiment has the following features:

● The return current diode FD201 is parallel combined between the negative terminal of the chargeable battery B101 and the negative terminal of the DC power source in reverse current direction;

● The load is parallel combined between the positive terminal of the chargeable battery B101 and the negative terminal of the power source, such that the load is normally driven by the power source, and such that when the current is cut off, the return current diode FD201 completes a return circuit; and ● The stabilized capacitor C101 is parallel combined with the load to stabilize the switching process. As a result, the capacity value of the capacitor can be optionally selected or the capacitor can be omitted.

For the embodiments illustrated in FIGS. 1 and 2, the following applications can be selected without changing the circuit principles.

1) The polarities and series combining relationships of the components may be arranged according to the requirements to match with the polarity relationships between the circuit and the power source.

2) The negative terminal of the chargeable battery B101 can be selected to connect with the negative terminal of the power source while permitting the anode A of the thyristor SCR101 to be connected to the positive terminal of the power source; or the cathode K of the thyristor SCR101 may be connected to the negative terminal of the power source while permitting the positive terminal of the battery B101 to be connected to the positive terminal of the power source.

3) The charging circuit components (including the temperature detector device TS101) can be assembled to the charger according to requirements, the charging circuit components and the chargeable battery can be assembled together, or part of the circuit components may be installed in the charger while the other components are installed in the chargeable battery and mutually connected through electric conductor junction devices, junction points, or plugs and receptacles.

In summary, the invention provides a temperature switch controlled automatic shut-off and transient state holding type charging circuit for applications involving a wide voltage variation range. The temperature switching device attached to the chargeable battery detects the charging saturation and temperature rising status of the battery to provide an automatic shut-off charging circuit, and automatic switching to a topping charge status. To suppress interference with the capacitor end voltage due to power source voltage variations, the current through a distributed voltage resistor R102 and zener diode ZD101 (and the optionally series combined light-emitting diode LED102) is used to provide the topping charge to the battery. A return current diode may be included to constitute an emergency automatic power supply circuit.

What is claimed is:

1. A battery charging circuit, comprising:

circuitry for connecting a battery with a power source, said power source being arranged to supply a charging current to the battery in a first current direction, wherein said circuitry includes a temperature controlled switch arranged to detect a temperature of a charging battery and, when the battery reaches a preset temperature, to cause a charging current supplied to the battery to be reduced to a small current sufficient to maintain a charged status of the battery, and wherein said circuitry is further arranged to reset said temperature controlled switch when said battery is disconnected from said circuit and when said power source is cut off;

a load connected between a first terminal of the battery and a first terminal of the power source, and arranged such that the load is normally driven by the power source; and a return current diode connected between a second terminal of the battery and a second terminal of the load in a reverse current direction opposite said first current direction, and arranged such that said battery supplies power to said load through said return current diode in said reverse current direction when said power source is cut-off.

2. A charging circuit as claimed in claim 1, wherein said charging circuitry further comprises:

a thyristor switch controlled by said temperature controlled switch to permit said charging current to be supplied to said battery; and a by-pass current limiting circuit connected in parallel with said thyristor switch for supplying said small current to said battery when said thyristor switch is tripped.

3. A charging circuit as claimed in claim 1, wherein said charging circuitry further comprising an AC transformer arranged to receive an AC power input, an AC current-limiting impedance, a rectifier device, a DC current limiting impedance, all connected in series between the power source and said first terminal of the battery.

4. A charging circuit as claimed in claim 1, further comprising a display circuit including a current-limiting resistor connected between the battery and the power source, said current-limiting resistor being connected in parallel with a light-emitting diode and in series with an overload protection component.

5. A charging circuit as claimed in claim 1, further comprising a distributed voltage component connected in series with a trigger capacitor, a first terminal of the distributed voltage component being connected to said battery, a second terminal of the distributed voltage component being connected to a first terminal of said trigger capacitor, and a second terminal of said trigger capacitor being connected to said power source.

6. A charging circuit as claimed in claim 5, wherein said charging circuitry further comprises a thyristor switch controlled by said temperature controlled switch to permit said charging current to be supplied to said battery, a cathode of said thyristor switch being connected to said battery and an anode of said thyristor switch being connected to the power source and to the second terminal of said trigger capacitor.

7. A charging circuit as claimed in claim 6, further comprising a switch connected between the anode of the thyristor and the second terminal of the battery, a switch connected between a gate of the thyristor and the second terminal of the trigger capacitor, a switch connected to the cathode of the thyristor, and a fourth switch connected between the cathode of the thyristor and the gate of the thyristor.

8. A charging circuit as claimed in claim 5, further comprising a discharge diode connected in parallel between the cathode and a gate of the thyristor and arranged to permit discharge of the trigger capacitor through a bypass distributed current resistor when the battery is removed.

* * * * *